United States Patent
Noble et al.

(10) Patent No.: US 7,127,712 B1
(45) Date of Patent: Oct. 24, 2006

(54) SYSTEM AND METHOD FOR PROVIDING A JAVA CODE RELEASE INFRASTRUCTURE WITH GRANULAR CODE PATCHING

(75) Inventors: Kenton E. Noble, Hillsborough, CA (US); Richard J. Lotero, San Mateo, CA (US); Subash Chadalavada, Fremont, CA (US); William Greene, Belmont, CA (US); Keith Swartz, Seattle, WA (US); Joseph H. Kent, Burlingame, CA (US); Joseph Epstein, San Bruno, CA (US)

(73) Assignee: Oracle International Corporation, Redwood Shores, CA (US)

( * ) Notice: Subject to any disclaimer, the term of this patent is extended or adjusted under 35 U.S.C. 154(b) by 592 days.

(21) Appl. No.: 10/073,669

(22) Filed: Feb. 11, 2002

Related U.S. Application Data

(60) Provisional application No. 60/268,886, filed on Feb. 14, 2001.

(51) Int. Cl.
*G06F 9/44* (2006.01)
(52) U.S. Cl. ............... 717/173; 717/168; 717/169
(58) Field of Classification Search ........... 717/173, 717/169, 168
See application file for complete search history.

(56) References Cited

U.S. PATENT DOCUMENTS

| | | | | |
|---|---|---|---|---|
| 5,495,610 | A * | 2/1996 | Shing et al. | 709/221 |
| 6,006,034 | A * | 12/1999 | Heath et al. | 717/170 |
| 6,052,531 | A * | 4/2000 | Waldin et al. | 717/170 |
| 6,349,407 | B1 * | 2/2002 | Towfiq | 717/170 |
| 6,425,126 | B1 * | 7/2002 | Branson et al. | 717/168 |
| 6,460,055 | B1 * | 10/2002 | Midgley et al. | 707/204 |
| 6,535,894 | B1 * | 3/2003 | Schmidt et al. | 707/204 |
| 2002/0174139 | A1 * | 11/2002 | Midgley et al. | 707/204 |

OTHER PUBLICATIONS

TDB-ACC-NO: NNRD412102, Disclosure Title: "System for Service Level Identification in a Client/Server WWW/Java Environment", Research Disclosure, Aug. 1998, UK. 6 pages, retrieved from EAST V 2.0.1.4. Nov. 22, 2004.*
Pugh, William; "Compressing Java Class Files", p. 247-258, 1999 ACM, retrieved from ACM database Jan. 13, 2005.*
"Updating a JAR File", 3 pages, retrieved from <URL http://java.sun.com/docs/books/tutorial/jar/basics/update.html>, retrieved Jan. 13, 2005.*
"Retrologic Systems RetroGuard Java Obfuscation", retrieved from google.com search, □□<URL http://www.retrologic.com/rg-docs-patchadv.htnl>, Jan. 13, 2005.*

* cited by examiner

*Primary Examiner*—Mary Steelman
(74) *Attorney, Agent, or Firm*—Brian D. Hickman; Hickman Palermo Truong & Becker LLP

(57) ABSTRACT

A system and method for providing a code release infrastructure with granular code patching is described. Code patches, each including at least one resource unit are provided. Each resource unit includes metadata and file components. Code libraries, each including at least one resource unit, are patched. The metadata for each resource unit in the code patches is compared to the metadata for each such corresponding resource unit in the code libraries. Each resource unit in the code patches is merged into the code libraries for each such corresponding resource unit that is out-of-date as defined by merge rules. Archive files, as defined by archive file definitions, are created or updated using the resource units from the code libraries, or, optionally, are deleted. The archive files are digitally signed also as required. The system and method enables source and derived code and third party code to be patched granularly.

53 Claims, 14 Drawing Sheets

70

Figure 15 (con'd).
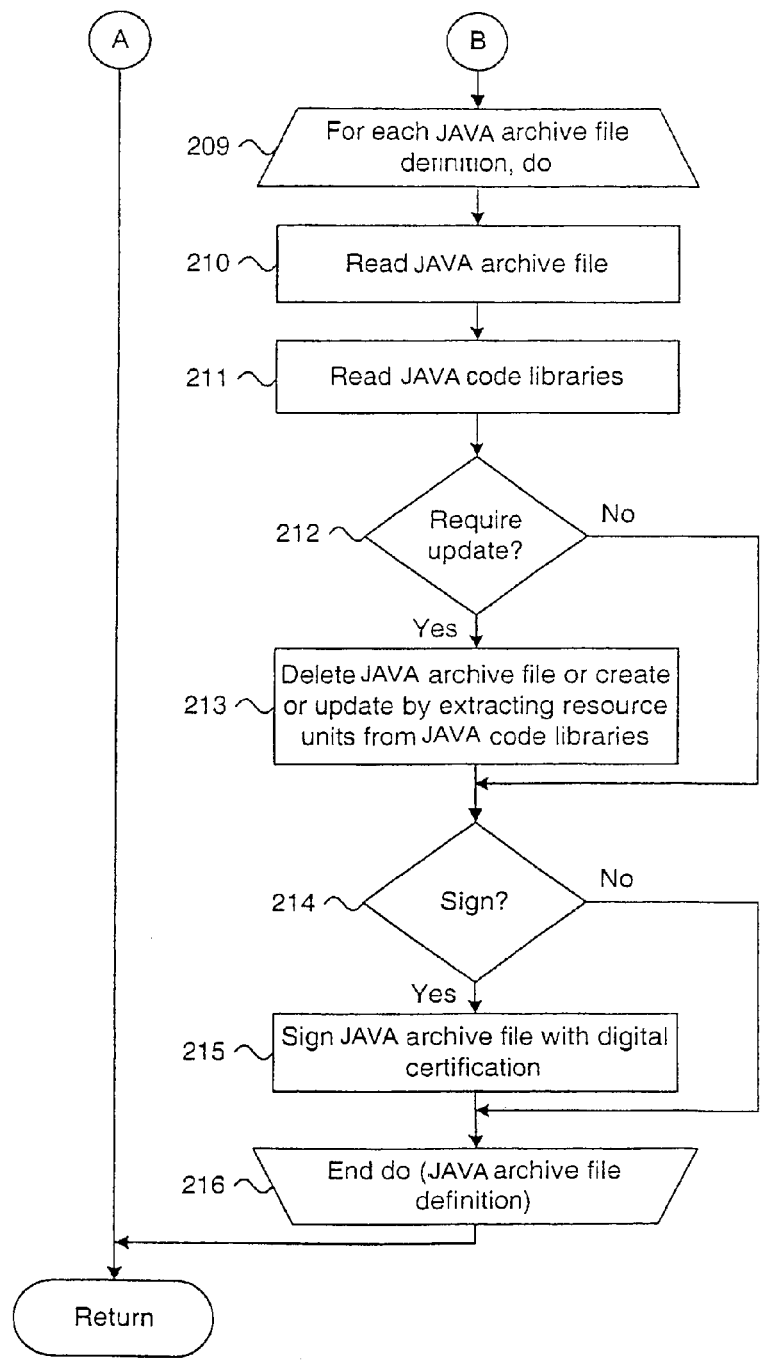

SYSTEM AND METHOD FOR PROVIDING A JAVA CODE RELEASE INFRASTRUCTURE WITH GRANULAR CODE PATCHING

CROSS REFERENCE TO RELATED APPLICATION

This patent application claims priority under 35 U.S.C. § 119(e) to provisional patent application Ser. No. 60/268,886, filed Feb. 14, 2001, the 10 disclosure of which is incorporated by reference.

FIELD OF THE INVENTION

The present invention relates in general to maintaining applications developed using the JAVA programming language and, in particular, to a system and method for providing a JAVA code release infrastructure with granular code 15 patching.

BACKGROUND OF THE INVENTION

Over the last ten years, corporate computing environments have evolved from monolithic proprietary mainframe computer systems to networks of decentralized heterogeneous computer systems. These distributed systems 20 typically include personal computers and work stations that offer productivity solutions with higher flexibility at lower cost.

At the same time, the cost and complexity of support has drastically increased. For example, the operating systems and applications software require periodic updates. Moreover, every different system configuration can require a 25 separate reinstallation of software, an operation which can be costly and time-consuming for a large installed user base.

The JAVA programming language was developed to encourage low maintenance application development by providing a machine-independent and architecture-neutral programming language capable of operating on heterogeneous computer systems independent of machine-specific environment and configuration settings. An overview of the JAVA programming language is described in P. van der Linden, "Just JAVA," Chapter 1, Sun Microsystems, Inc (1997 2d ed.), the disclosure of which is incorporated by reference. The most common JAVA programs are applications and applets. Applications are stand-alone programs. Applets are similar to applications, but adhere to a set of interface conventions and run only within the context of a JAVA-enabled container, such as a Web browser. During execution, the container downloads the byte code required to run the applet as needed.

The Java programming language provides a convenient means for disseminating software updates using Zip archives or Java Archive (JAR) files. These archives and files can be used to deliver and directly run Java applications and applets. The Zip archives and JAR files are packaged in a Zip format that allows multiple files to be bundled as a single archive file. In addition, JAR files include a manifest storing attributes for each of the bundled files and can include an optional digital signature. JAR files are described in D. Flanagan, "Java in a Nutshell," Chapter 24, O'Reilly and Assocs. (1999 3d ed.), the disclosure of which is incorporated by reference.

Although offering a convenient way to deliver JAVA program updates, Zip archives and JAR files create a problem, known as the "high water mark" problem. The high water mark problem results from the inability to deliver specific updates or patches to individual component files using a JAR file. Rather, when JAVA program updates or patches are delivered using JAR files, an entire JAR file is delivered, instead of just a single updated component file. Moreover, to ensure that each JAR file is current, the JAR file must always include the latest version of each component file. A single updated component file cannot be delivered and a complete high water mark JAR file must be delivered instead. Delivering a complete high water mark JAR file results in delivering many other potentially undesirable changes, which can include unexpected behavioral changes, or other highly destabilizing changes to the product.

To avoid the high water mark problem, JAVA program updates can be delivered in the form of individual files stored within an operating system directory structure. Each separate update or patch can then be delivered to effect individual changes without unanticipated side effects. However, this approach poses difficulties with file naming conventions. The JAVA programming language supports long file and class names which are language features not supported on every operating system. JAVA source and class file names can contain special characters, such as the dollar sign, which can cause portability concerns. Similarly, the JAVA programming language uses the Unicode character set, an internationalized character set that may not be fully supported on all platforms, potentially causing further portability concerns.

These individual update or patch files also introduce directory nesting concerns. JAVA packages are implemented as directories in a hierarchical file structure. Packages can be stored in deeply nested directories. However, the nesting depth can exceed the maximum permissible depth on a given platform. Consequently, these JAVA programming language-specific file naming and directory storage conventions limit the operating systems that can directly support single file updating and patching.

JAR files lack integrity controls for ensuring the proper application of updates and patches. The order in which updates and patches are applied should not ordinarily determine the end result of the application. However, JAVA updates and patches can be generated and applied in any order. Moreover, neither JAR files nor individual patch and update files include a revision control mechanism to ensure that out-of-date class files do not overwrite the latest versions.

Inner classes further complicate JAVA program updating and patching. A single JAVA source file that uses the JAVA "inner class" construct can produce multiple JAVA class files. Inner classes make tracking out-of-date JAVA class files difficult.

Finally, other issues arise when patching and updating JAVA applets. Applets are generally loaded into a JAVA-enabled browser in a JAR file format. Some applets must be signed with a digital signature to work properly. Consequently, the JAR file in which applets are delivered must be signed. If a JAVA application being updated or patched requires a signature, either the signed high water mark JAR file must be delivered or the JAR file must be assembled and signed at the customer site. In addition to the problem inherent with delivering any high water mark file, delivering signed high water mark JAR files does not allow the integration of third-party code, that is, code not available when the JAR files are created.

Therefore, there is a need for an approach for providing a JAVA code release infrastructure. Preferably, such an approach would resolve the high water mark, patch integrity and revision control problems while supporting long file names, special characters, extended character sets, deeply nested packages, and inner classes.

There is a further need for an approach for providing granular patching of individual class files while maintaining the integrity of the source file to which the class belongs. Preferably, such an approach would include a facility to integrate third-party code into the patching process.

SUMMARY OF THE INVENTION

The present invention provides a system and method for building and maintaining applications written in the JAVA programming language. Resource units are incorporated into a JAVA code release infrastructure. Each resource unit is created from a set of source or derived files, preferably written in the JAVA programming language and can include third-party code. The resource units include metadata that identifies and describes the contents. The version attribute of each resource unit can be derived from a revision string in the source file maintained by a revision control system. A set of JAVA code libraries, each including one or more resource units, is created and staged. Individual JAVA code patches, each made up of one or more resource units, are generated from JAVA code patch definitions. A patch tool compares the resource units in the JAVA code patches with those in JAVA code libraries and updates the resource units in JAVA code libraries as needed. If necessary, a set of JAVA archive (JAR) files, as defined by JAVA archive file definitions, are created or updated by extracting resource units from the JAVA code libraries. The JAR files are signed with a digital signature if required. In addition, obsolete JAR files are deleted.

An embodiment of the present invention is a system and method for providing a JAVA code release infrastructure with granular code patching. One or more JAVA code patches including at least one resource unit are provided. The JAVA code patch contains only those resource units that need to be updated but can optionally contain additional resource units. Each resource unit includes metadata and file components. The file components can include source JAVA files, derived JAVA files, and non-JAVA files. One or more JAVA code libraries, each including at least one resource unit, are patched. The metadata for each resource unit in the JAVA code patches is compared to the metadata for each such corresponding resource unit in the JAVA code libraries. The file components in each resource unit in the JAVA code patches are merged into the JAVA code libraries for each such corresponding resource unit that is out-of-date. If needed, only those JAVA archive files with resource units that are out-of-date when compared to corresponding resource units in JAVA code libraries are created or updated, and signed with a digital signature also if required.

A further embodiment is a system and method for patching staged code in a JAVA code release infrastructure. One or more staged JAVA code libraries are maintained in a staged code repository. Each JAVA code library includes at least one resource unit. Each resource unit includes metadata and file components. The JAVA code patches are stored in a patch repository and can be downloaded to the client to stage. One or more JAVA code patches in a staged patch repository are accessed. Each JAVA code patch includes at least one resource unit. The metadata for each resource unit in the staged JAVA code patches is compared to the metadata in the staged JAVA code libraries for each such corresponding resource unit. The file components in each resource unit in the staged JAVA code patches are merged into the staged JAVA code libraries for each such corresponding resource unit that is out-of-date. The JAVA code libraries can be implemented as a virtual file system and can be used directly by a JAVA Virtual Machine (JVM). If necessary, a set of JAVA archive (JAR) files, as defined by JAVA archive file definitions, are created or updated by extracting resource units from the JAVA code libraries. The JAR files are signed with a digital signature if required. In addition, obsolete JAR files are deleted.

A further embodiment is a system and method for generating JAVA code patches in a JAVA code release infrastructure. One or more JAVA code patch definitions describe the contents of JAVA code patches. A JAVA code patch definition identifies the set of resource units that must be included in the corresponding JAVA code patch. Each resource unit includes metadata and file components and is generated using files maintained in a source code repository. The resource units are packaged into JAVA code patches and staged. The staged JAVA code patches are stored into a staged patch repository from which the metadata for each resource unit is compared to the metadata for each such corresponding resource unit in the staged JAVA code libraries. The file components in each resource unit in the staged JAVA code patches are merged into the staged JAVA code libraries for each such corresponding resource unit that is out-of-date.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
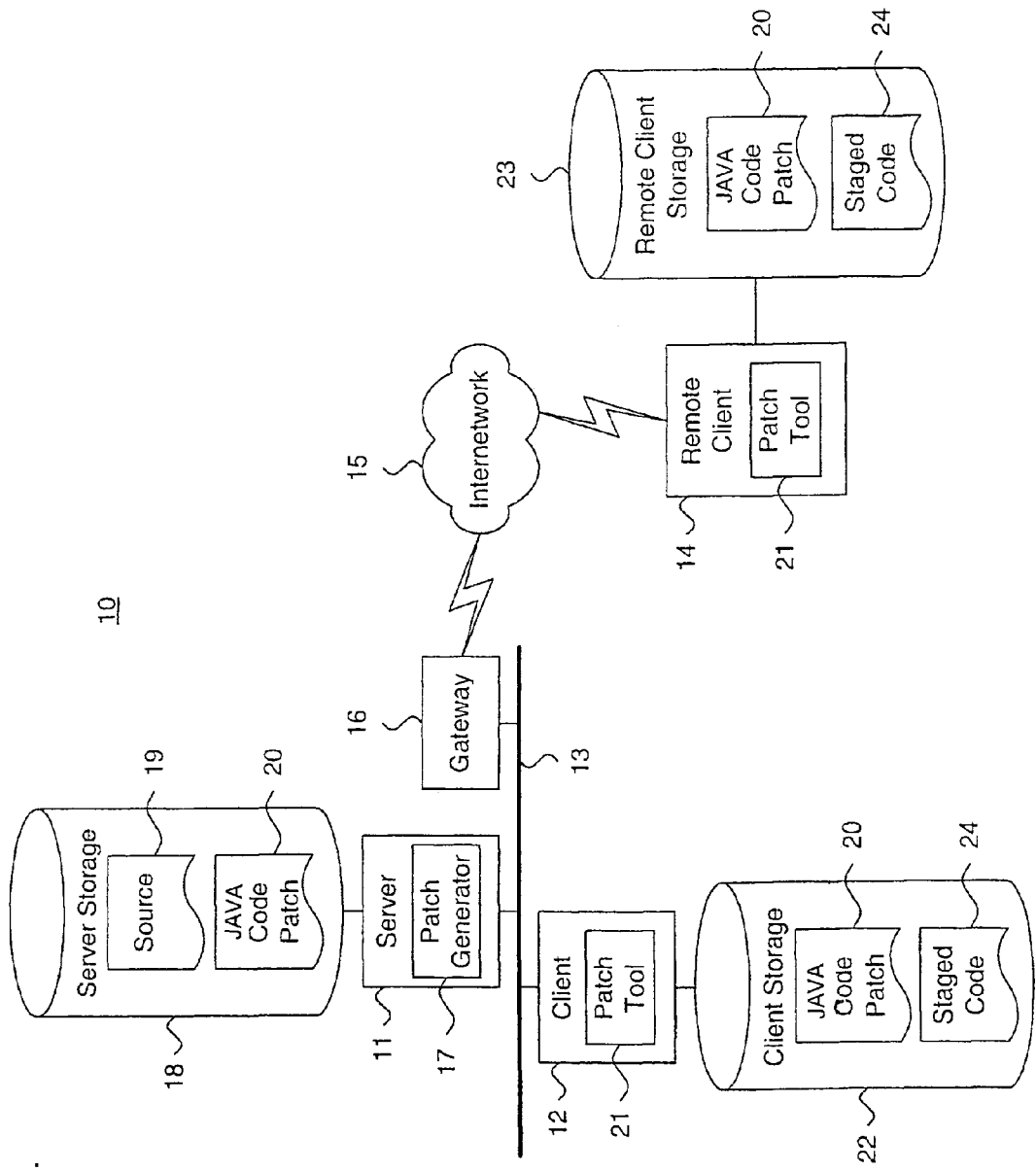
FIG. 1 is a functional block diagram of a distributed computing environment, including a system for providing a JAVA code release infrastructure with granular code patching, in accordance with the present invention.

FIG. 1 is a functional block diagram of a distributed computing environment, including a system 10 for providing a JAVA code release infrastructure with granular code patching, in accordance with the present invention. The system 10, as further described below beginning with reference to FIG. 2, includes a patch generator 17 operating on a server 11 and a patch tool 21 operating on a client 12 or remote client 14. The server 11 is interconnected with the client 12, via a network 13, such as an intranetwork. The server 11 is coupled to a server storage device 18 while the client 12 is coupled to a client storage device 22. The server 11 can also be interconnected with a remote client 14 and coupled to a remote client storage device 23, via an internetwork 15, such as the Internet. The intranetwork 13 is interfaced to the internetwork 15 via a gateway 16. Other network topologies, configurations and components are feasible, as would be recognized by one skilled in the art.

The server 11 is used to build and maintain applications written in the JAVA programming language and other application programming languages. The applications are stored as source files 19 in the server storage device 18. As the applications are modified by updates and bug fixes, the patch generator 17 generates a set of JAVA code patches 20 that are downloaded by the client 12 and remote client 14. The patch tool 21 compares the contents of the JAVA code patch 20 to the contents of staged code 24 stored in the client storage device 22 or remote client storage device 23, respectively. The staged code 24 is updated by the patch tool 21 as needed.

The individual computer systems, including the server 11, client 12 and remote client 14, are general purpose, programmed digital computing devices consisting of a central processing unit (CPU), random access memory (RAM), non-volatile secondary storage, such as a hard drive or CD-ROM drive, network interfaces, and peripheral devices, including user-interfacing means, such as a keyboard and display. Program code, including software programs written in the JAVA programming language, and data, are loaded into the RAM for execution and processing by the CPU and results are generated for display, output, transmittal, or storage.

Figure 2:
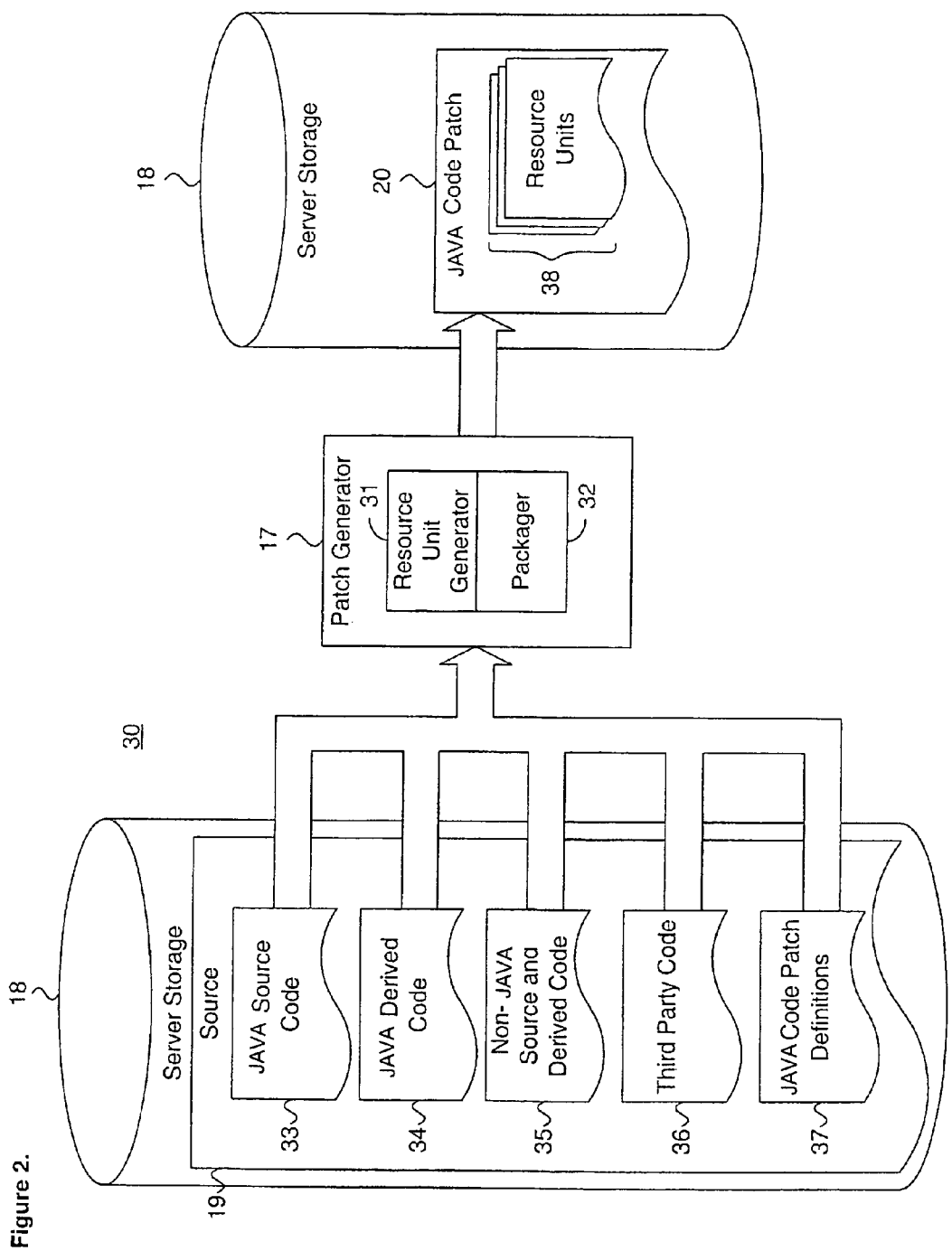
FIG. 2 is a block diagram showing the patch generator used in the system of FIG. 1.

FIG. 2 is a block diagram 30 showing the patch generator 17 used in the system 10 of FIG. 1. The patch generator 17 consists of two modules: resource unit generator 31 and packager 32. The resource unit generator 31 processes a set of files 19 (hereafter "source") to create resource units 38. The packager 32 bundles resource units 38 into a set of JAVA code patches 20, as defined by a set of JAVA code patch definitions 37. The JAVA code patch definitions 37 identify resource units 38 and the versions that must be included in the JAVA code patches 20. The source 19 and the JAVA code patches 20 are stored in the server storage device 18. The JAVA code patches 20 are made available to the patch tool 21, as further described below with reference to FIG. 3.

Individual JAVA applications (not shown) are executed by a JVM. Each JAVA application comprises byte code, which is a machine-independent form of binary code and interpretable by any JVM independent of architecture or operating system. The byte code is included in the resource units 38.

Resource units 38 form the basis of the JAVA code release infrastructure to enable granular code patching. A resource unit 38 is the smallest entity capable of being updated or patched. Resource units 38 are formed from metadata information (not shown) and file components stored in the source files 19, which include JAVA source code 33, JAVA derived code 34, non-JAVA source and derived code 35, and third party code 36. Metadata information is derived from the JAVA source code 33, JAVA derived code 34, non-JAVA source and derived code 35, and third party code 36, and includes attributes, such as a unique identifier, version and similar information. A set of JAVA code patch definitions 37 are used by the resource unit generator 31 to identify the versions of the resource units 38 to include in each JAVA code patch 20.

Figure 3:
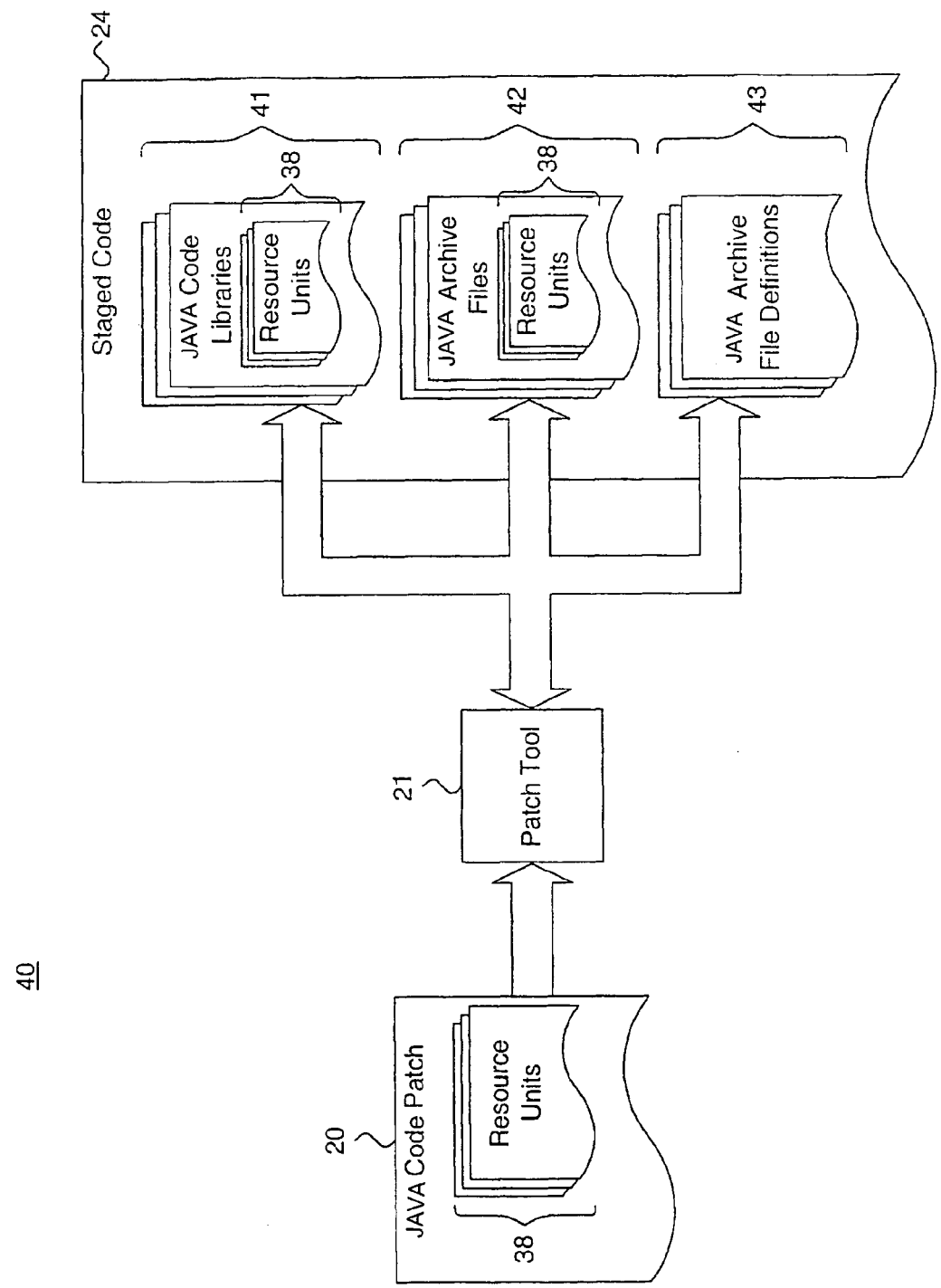
FIG. 3 is a block diagram showing the patch tool used in the system of FIG. 1.

FIG. 3 is a block diagram 40 showing the patch tool 21 used in the system 10 of FIG. 1. The JAVA code patches 20 are staged on client storage device 22 or remote client storage device 23 (not shown). The patch tool 21 compares the set of JAVA code patches 20, packaged by the patch generator 17 (shown in FIG. 2) to the set of staged code 24 and updates the staged code 24 as necessary. The resource units within the staged JAVA code libraries 41 are updated with resource units from the JAVA code patches 20, as further described below with reference to FIG. 6. The set of staged code files 24 includes a set of JAVA code libraries 41 and a set of JAVA archive files 42. The patch tool 21 maintains a set of JAVA archive file definitions 43 for describing the contents of the JAVA archive files 42 in terms of individual resource units 38.

Each JAVA code library 41 includes one or more resource units 38 bundled in a JAVA archive (JAR) or cabinet archive (CAB) format. A JAVA code library in Zip format provides a portable virtual file system, which can be used directly by a JAVA virtual machine (JVM). The JAVA code libraries 41 can also be stored in an operating system directory structure or in a database (not shown).

The set of JAVA code libraries 41 need not be in the same format. JAVA code libraries 41 referenced by the patch tool 21 can be third-party code, which is maintained separately from the JAVA code release infrastructure.

The JAVA archive files 42 can be used by stand-alone JAVA applications or JAVA applets running in a browser application. Each JAVA archive file 42 includes one or more resource units 38 plus additional functionality for use by JAVA applets. Each JAVA archive file 42 also includes a manifest storing attributes describing the included resource units 38 and an optional digital signature.

Each JAVA archive file definition 43 describes the contents of an associated JAVA archive file 42 in terms of resource units 38. Similarly, the JAVA archive file definitions 43 can be used to describe an associated JAVA archive file that has become obsolete. The JAVA archive file definition 43 is extensible and allows customizations.

Thus, when creating or updating JAVA archive files 42, the patch tool 21 first references the set of JAVA archive file definitions 43. The patch tool 21 compares the resource units 38 from the JAVA code libraries 41 with the corresponding resource units 38 from the JAVA archive files 42. Resource units 38 required in a JAVA archive file 42 can be from third-party JAVA code libraries 41 which are maintained separately from the infrastructure. The patch tool 21 updates the JAVA archive files 42 by replacing out-of-date resource units 38 from the JAVA archive files 42 with newer resource units 38 from the JAVA code libraries 41 as needed.

Figure 4:
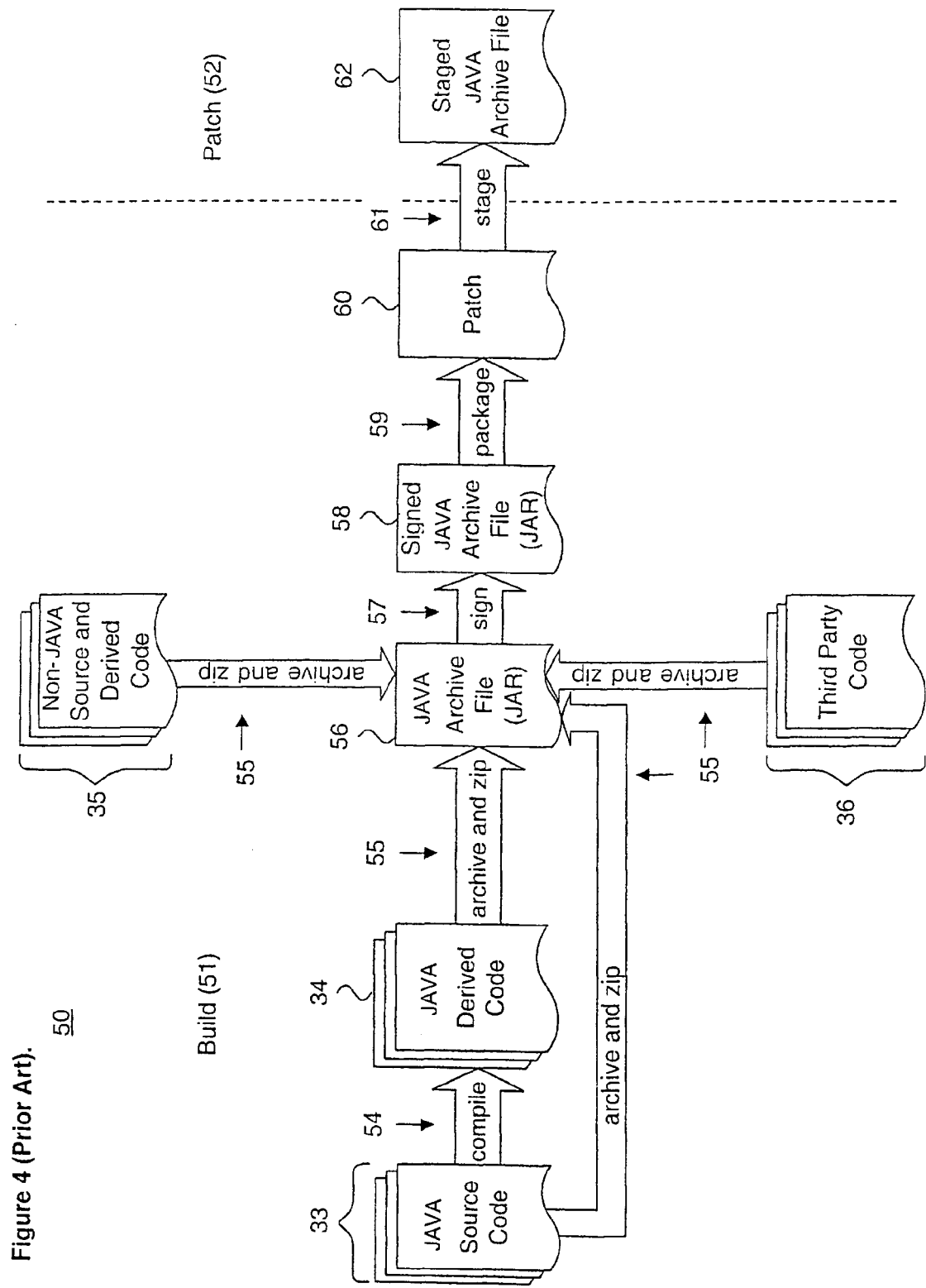
FIGS. 4 and 5 are process flow diagrams showing prior art JAVA code patching systems.
Figure 5:
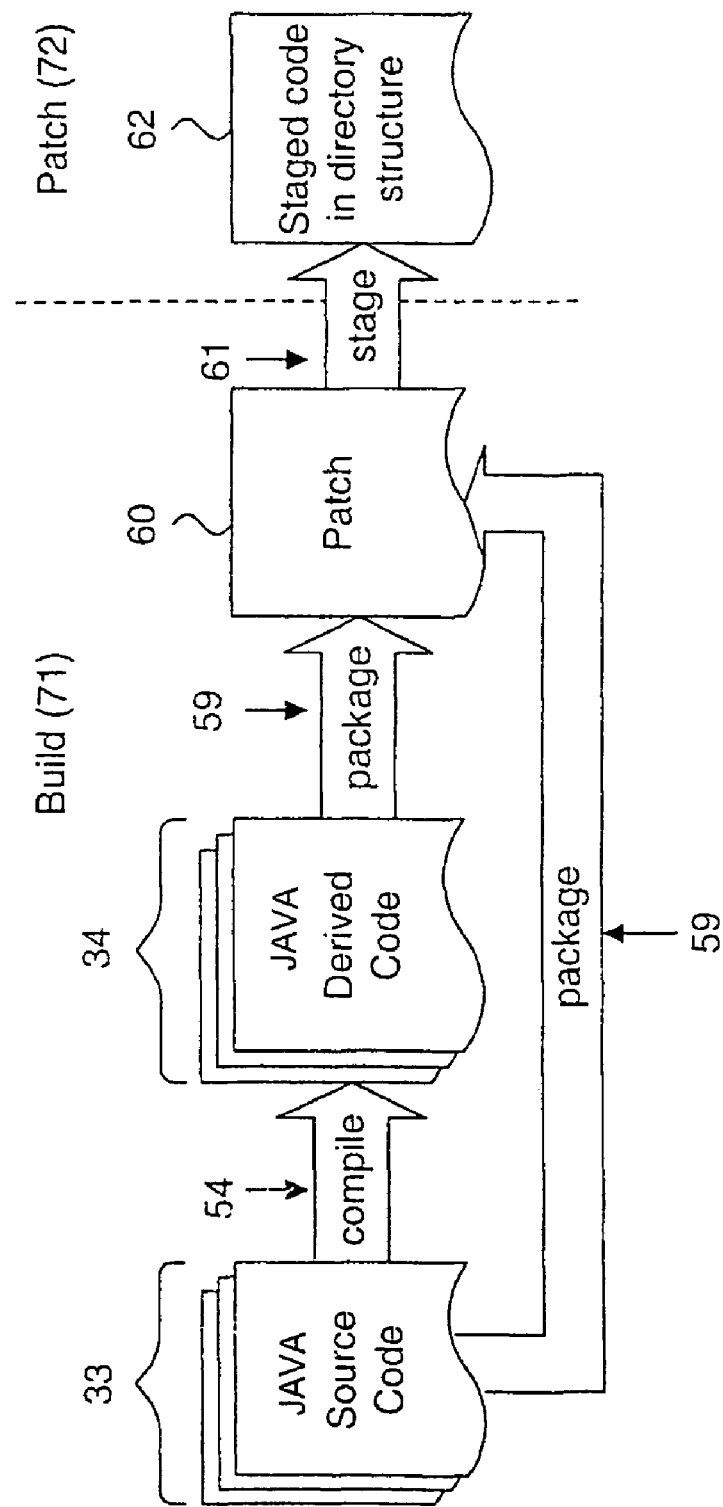

FIGS. 4 and 5 are process flow diagrams 50 and 70, respectively, showing prior art JAVA code patching systems for patching JAR files and staged code in a directory structure, respectively. The respective process flows are divided into build phases 51, 71 and patch phases 52, 72.

Referring first to FIG. 4, JAVA source code 33 is compiled (transition 54) using a JAVA compiler (not shown) into JAVA derived code 34. For example, a JAVA source code file A.java, when compiled using a JAVA compiler, creates a JAVA class file A.class. The JAVA class file A.class is said to be derived from AVA source code A.java. Similarly, a VA source file that uses an "inner class" structure compiles into multiple derived JAVA class files. Non-JAVA code includes, but is not limited to, files such as a GIF image file required by a JAVA application or a JAVA applet. The JAVA source code 33 and JAVA derived code 34 along with non-JAVA source and derived code 35 and third-party code 36 required for JAVA applets are archived and compressed using the Zip format (transition 55) into a JAVA archive file 56. Optionally, the JAVA archive file 56 is signed (transition 57) with a digital certificate to form a signed JAVA archive file 58. The JAVA archive file 56 or the signed JAR file 58 is packaged (transition 59) into a patch file 60. The patch file 60 is then staged (transition 61) as a staged JAVA archive file 62 and made available for patching (transition 52) for use by JAVA applications and applets (not shown).

Referring now to FIG. 5, as before, JAVA source code 33 is compiled (transition 54) using a JAVA compiler (not shown) into JAVA derived code 34. Those JAVA source files 33 and JAVA derived code 34 used by stand-alone JAVA applications are packaged (transition 59) into a patch file 60. The patch file 60 is then staged (transition 61) and made available for patching (patch phase 72) directly into an operating system directory structure as staged code in the directory structure 62.

Referring back to FIG. 4, compiling the JAVA source code files 33 and packaging the JAVA derived code 34 along with other non-JAVA code 35 and third-party code 36 into a single JAVA archive file 56 prior to staging causes the high water mark problem. Each JAVA archive file 56 must always be packaged with the latest versions of the constituent JAVA source code files 33, JAVA derived code files 34, non-JAVA source and derived code files 35, and third-party code files 36. Otherwise, the JAVA archive file 56 could inadvertently back out changes previously made to JAVA source code files 33, JAVA derived code files 34, non-JAVA source and derived code files 35, or third-party code files 36 previously used to patch staged code. The high water mark problem causes any attempt to deliver a single change to potentially result in delivering other unanticipated or undesirable changes, including unexpected behavioral or destabilizing changes to an application or applet.

Similarly, when multiple JAVA class files 34 are derived from a single JAVA source code file 33 such as required when updating JAVA inner classes, the prior art JAVA code patching system does not guarantee that all of the derived JAVA classes are updated as a unit. As well, the staged code in the directory structure 62 can place severe restrictions on the use of features supported by the JAVA programming language that may not be fully supported on all platforms. These features include long file names, deeply nested packages, extended character sets, and special characters included in file names.

Figure 6:
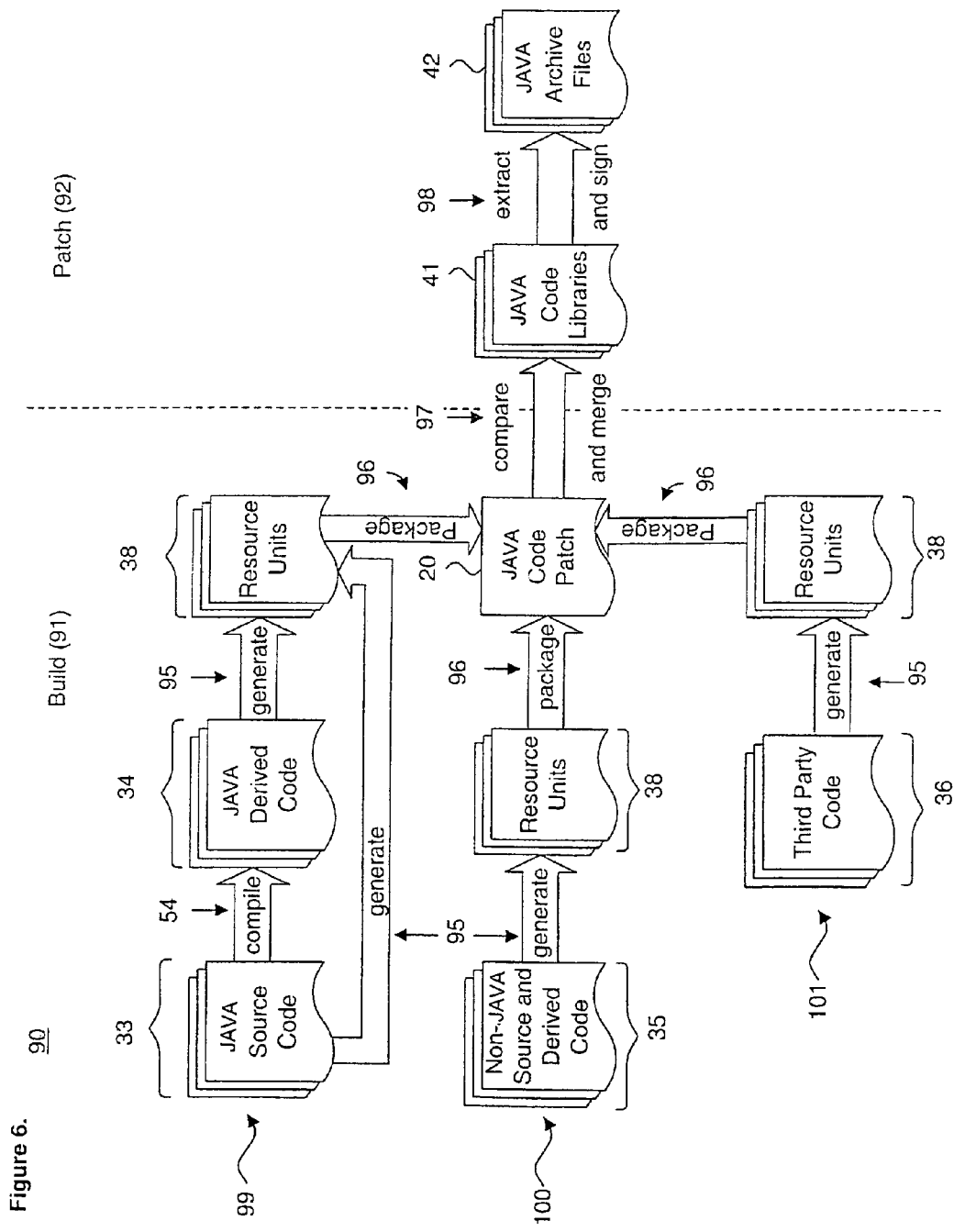
FIG. 6 is a process flow diagram showing the JAVA code release infrastructure system of FIG. 2 and FIG. 3.

FIG. 6 is a process flow diagram 90 showing the JAVA code release infrastructure system 30 of FIG. 2 and system 40 of FIG. 3. The process flow is divided into build phase 91 and patch phase 92. During the build phase 91, JAVA code patches 20 are generated along three individual processing threads (99, 100, 101) based on the type of originating source code. The set of JAVA code patch definitions 37 (shown in FIG. 2) defines the contents of each JAVA code patch 20 in terms of resource units 38.

During the first thread 99, JAVA source code files 33 are compiled 30 (transition 54) using a JAVA compiler (not shown) into JAVA derived code files 34. Resource units 38 are generated (transition 95) from the source 33 and JAVA derived code files 34, as further described below with reference to FIG. 7. This set of files 33 and 34 can include JAVA class files that correspond to JAVA inner classes and use JAVA-native file naming conventions. Metadata information (not shown) for the source and derived JAVA code files 33, 34 is generated (transition 95) and resource units 38 are packaged (transition 96) into JAVA code patches 20. The metadata information for each resource unit 38 identifies the contents of the resource unit 38 and includes attributes, including a unique identifier and version number. The resource unit version can be derived from a revision string in each JAVA source code file 33 maintained by a revision control system (not shown).

During the second thread 100, non-JAVA source and derived code files 35 are used to generate (transition 95) resource units 38, as further described below with reference to FIG. 7. Metadata information (transition 95) is generated and the resource units 38 are packaged (transition 96) into the JAVA code patches 20.

During the third thread 101, third party code files 36 are used to generate (transition 95) resource units 38, as further described below with reference to FIG. 7. Metadata information is generated (transition 95) and the resource units 38 are packaged (transition 96) into the JAVA code patches 20. During the patch phase 92, the JAVA code patches 20 are compared to and merged into (transition 97) JAVA code libraries 41 using the system of FIG. 3. Resource units in the JAVA code patches 20 are compared to the corresponding resource units in the JAVA code libraries 41 and, if necessary, merged (transition 97). To merge the resource units, the out-of-date resource units in the JAVA code libraries 41 are replaced by the corresponding resource units in the JAVA code patches 20. In addition, any resource units missing from the JAVA code libraries 41 are added from the JAVA code patch 20 and any obsolete resource units are optionally deleted. Then, if necessary, resource units are extracted (transition 98) from the JAVA code libraries 41 and are used to create or update the JAVA archive files 42. Finally, the JAVA archive files 42 are optionally signed (transition 98) using a digital certificate (not shown) to create signed JAVA archive files 42.

Figure 7:
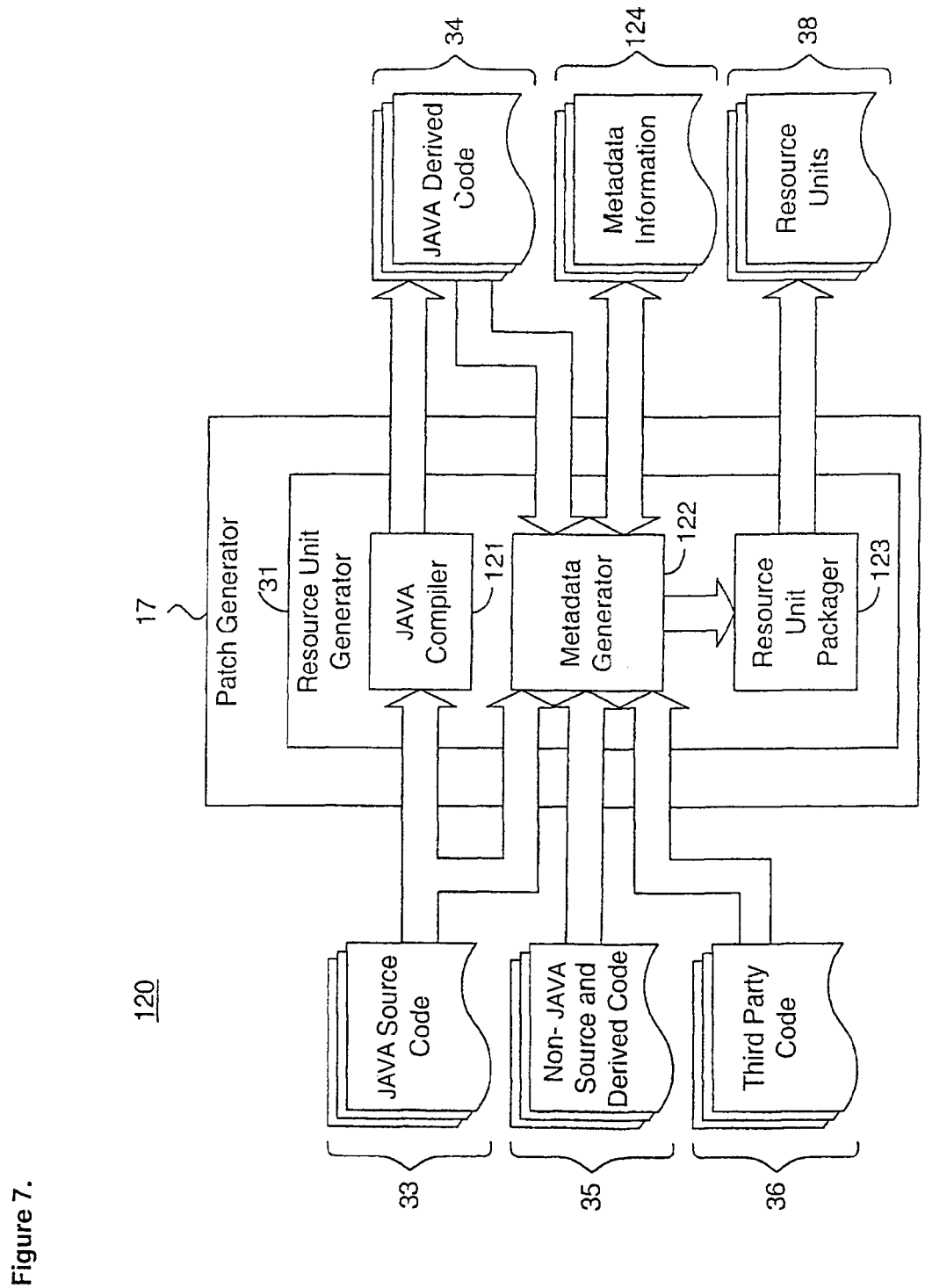
FIG. 7 is a block diagram showing the software modules of the resource unit generator of FIG. 2.

FIG. 7 is a block diagram 120 showing the software modules of resource unit generator 31. The resource unit generator 31 is part of the patch generator 17 of the JAVA code release infrastructure system 10 of FIG. 1. As described above with reference to FIG. 2, the patch generator 17 includes two modules, resource unit generator 31 and packager 32. The patch generator 17 generates JAVA code patches 20 (shown in FIG. 2) containing one or more resource units 38. Each resource unit 38 consists of a set of JAVA files, including JAVA source 33 and derived files 34, non-JAVA source and derived files 35, third-party code files 36, and metadata 124 describing the contents of the resource unit 38. The non-JAVA source files 35 can include, for instance, image files.

During operation, the resource unit generator module 31 identifies the set of files required for each resource unit 38 using the JAVA code patch definitions 37 (shown in FIG. 2). JAVA source files 33 are compiled using a JAVA compiler 121 to produce a set of JAVA derived code 34. A single JAVA source file 33 can result in more than one JAVA derived file 34. For example, the following JAVA code segment defines a JAVA class A.class and an inner JAVA class A$Inner.class:

```
package oracle.apps.wip.util ;20 import java.io.* ;
public class A {
public static final String RCS_ID =
"$Header: A.java 115.3 2000/02/14 12:00:00 \appldev ship $" ;
private boolean done ;
public A(final InputStream istream)
{
Thread reader = new Thread ( ) {
public void run ( )
done = true ;
return A.foo( ) ;
    }
} ;
}
private static class Inner { int x ; int y ; }
}
```

When compiled, this JAVA source would result in multiple JAVA derived files 34, namely, A.class, A$1.class and A$Inner.class. These files must be packaged and updated as a unit.

Figure 8:
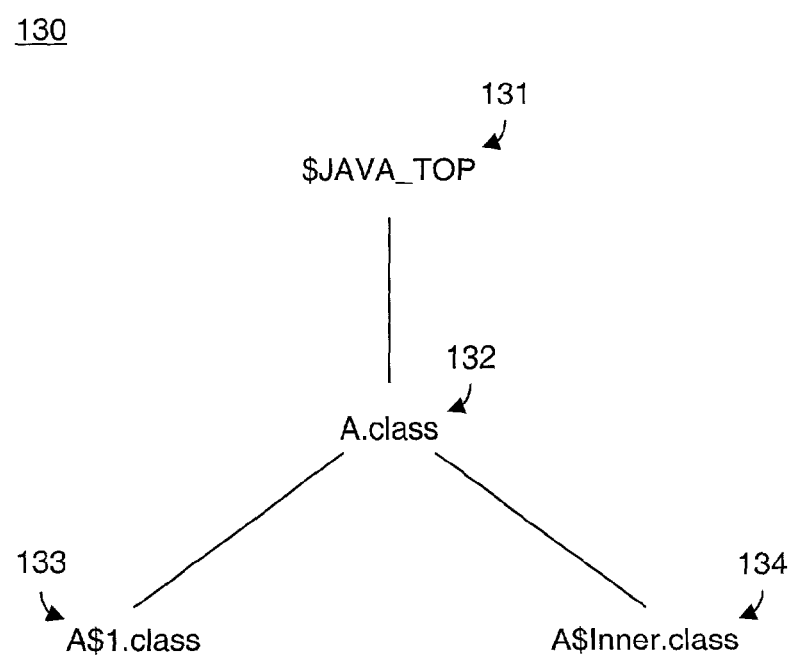
FIG. 8 is a tree diagram showing, by way of example, a sparse JAVA tree structure.

FIG. 8 is a tree diagram showing, by way of example, a sparse JAVA tree structure 130. The sparse JAVA tree 130 illustrates the hierarchical structuring of the JAVA code segment described above. The sparse JAVA tree 130 is a hierarchical data structure with a root node JAVA_TOP 131. The individual JAVA classes A.class, A$1.class, and A$Inner.class, are defined in a JAVA source code file and correspond to components of a resource unit staged together to reflect class inheritance. The JAVA class A.class 132 has two child classes, A$1.class 133 and A$Inner.class 134. When compiled, this JAVA class definition would result in multiple class files, namely, A.class 132, A$1.class 133, and A$Inner.class 134.

Referring back to FIG. 7, after all JAVA source files 33 have been compiled, the metadata generator 122 generates metadata information 124 that is included in the resource units 38. The metadata information 124 describes the contents of each resource unit 38 and includes other attributes, such as an identifier that uniquely identifies the resource unit 38 and a version attribute used when comparing resource units.

The resource unit packager 123 bundles the JAVA source 33, JAVA derived code 34, non-JAVA source and derived code 35, third-party code 36, and metadata 124 into the resource units 38. In the described embodiment, resource units 38 are packaged as Zip archives, although other formats are feasible, as described above. Resource units 38 allow the use of JAVA-native features, including long file and class names, file names containing special characters, JAVA inner classes, and deeply nested packages implemented as directories.

Figure 9:
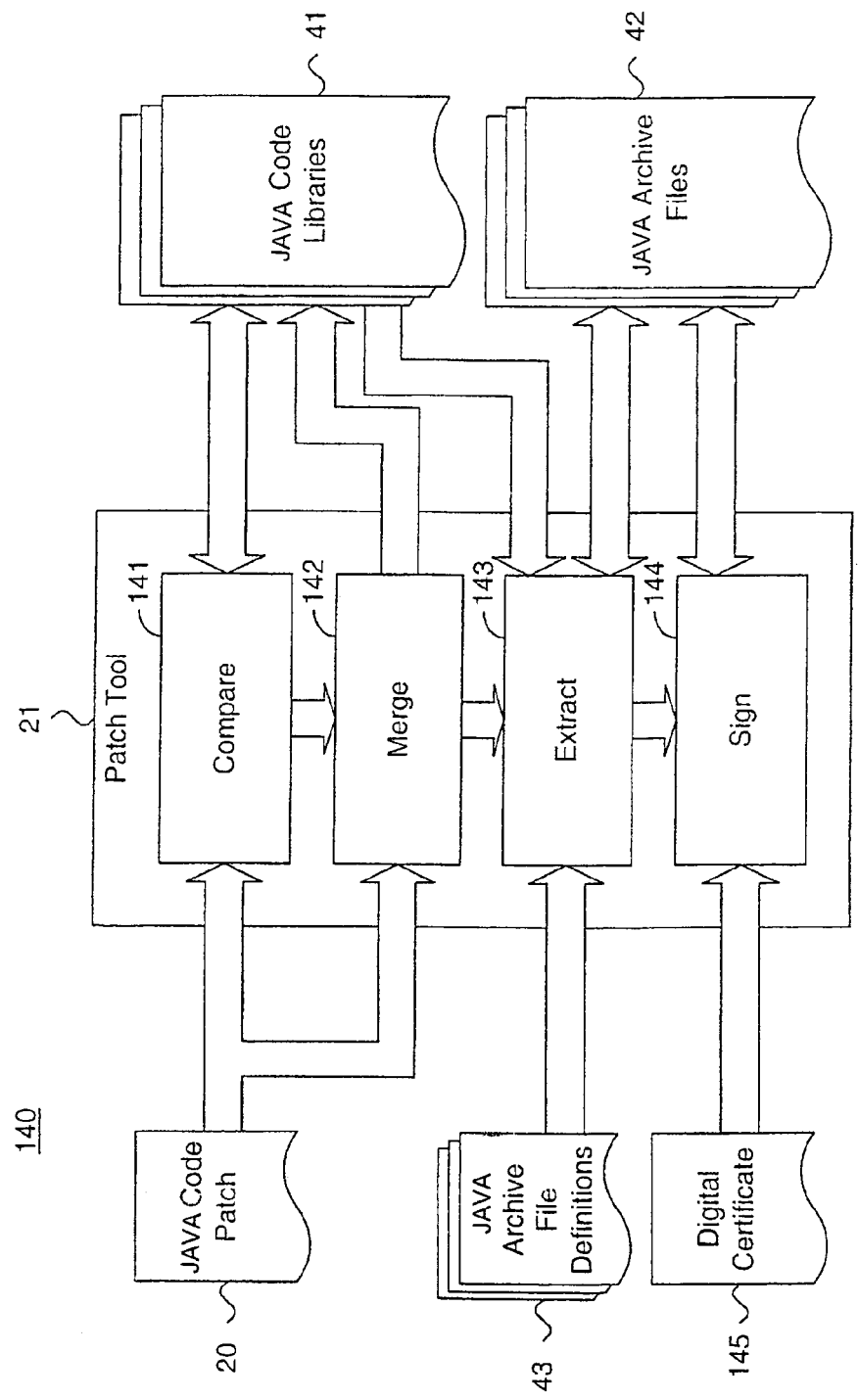
FIG. 9 is a block diagram showing the software modules of the patch tool of FIG. 3.

FIG. 9 is a block diagram 140 showing the software modules of the patch tool 21 of FIG. 3. The patch tool 21 updates the staged code files 24 (shown in FIG. 1) using the resource units stored in JAVA code patches 20. The staged code 24 includes JAVA code libraries 41 and JAVA archive files 42. Each JAVA code library 41 can include JAVA source code, JAVA derived code, non-JAVA code and third-party code. Although the patch tool 21 is used to maintain JAVA code libraries 41, not all JAVA code libraries need to be maintained by the JAVA release infrastructure. This flexibility allows for staged third party code. When generating the JAVA archive files 42, not necessarily all of the JAVA code libraries are referenced by the patch tool 21.

The patch tool 21 includes four modules: compare 141, merge 142, extract 143, and sign 144. The compare module 141 compares resource units included in the set of JAVA code patches 20 to corresponding resource units included in the JAVA code libraries 41. The compare module 141 compares, for instance, the version attribute of corresponding resource units to determine if a resource unit in any JAVA code library 41 requires updating. The compare module uses a set of rules that allow a newer resource unit to be replaced by an older resource unit for the purposes of backing out a previously applied JAVA code patch.

The merge module 142 updates the JAVA code libraries 41 by removing obsolete resource units, adding any resource units that are missing and replacing 15 out-of-date resource units in the JAVA code libraries 41 with updated resource units from the JAVA code patches 20.

In the described embodiment, any resource unit included in a JAVA code library 41 that does not have a version attribute is replaced with a corresponding resource unit from a JAVA code patch 20. The set of rules used when comparing resource units and determining out-of-date resource units are flexible and provide the ability to back out changes made by a prior JAVA code patch, when required. Other merging rules can be applied to implement a resource unit updating policy, as would be recognized by one skilled in the art.

The extract module 143 uses the set of JAVA archive file definitions 43 to identify a set of JAVA archive files 42 in terms of included resource units. Each JAVA archive file 42 includes a set of resource units stored in a JAVA archive (JAR) file format. JAVA archive files 42 are primarily used by JAVA applets running in JAVA-enabled browser applications. If a required JAVA archive file 42 does not already exist as a staged code file 24 or requires an update, the extract module 143 extracts the required resource units from the JAVA code libraries 41 to create or update the JAVA archive file 42.

Finally, if required the sign module 144 digitally signs JAVA archive files 42 using a digital certificate 145. Digital signatures are used by JAVA applications and applets to authenticate the sources of JAVA code included in JAVA archive libraries.

Figure 10:
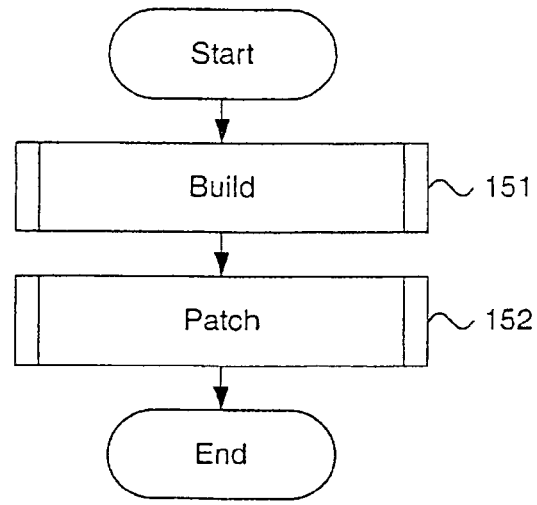
FIG. 10 is a flow diagram showing a method for providing a JAVA code release infrastructure with granular code patching, in accordance with the present invention.

FIG. 10 is a flow diagram showing a method 150 for providing a JAVA code release infrastructure with granular code patching, in accordance with the present invention. The method proceeds in two phases: build 151 and patch 152, as further described below in FIG. 11 and FIG. 14, respectively. During the build phase 151, JAVA code patches 20 (shown in FIG. 2) are created by the patch generator 17 (shown in FIG. 2). During the patch phase 152, the resource units 38 (shown in FIG. 3) stored in the JAVA code patches 20 are compared and, if necessary, merged into the contents of the staged code 24 using the patch tool 21 (shown in FIG. 3).

Figure 11:
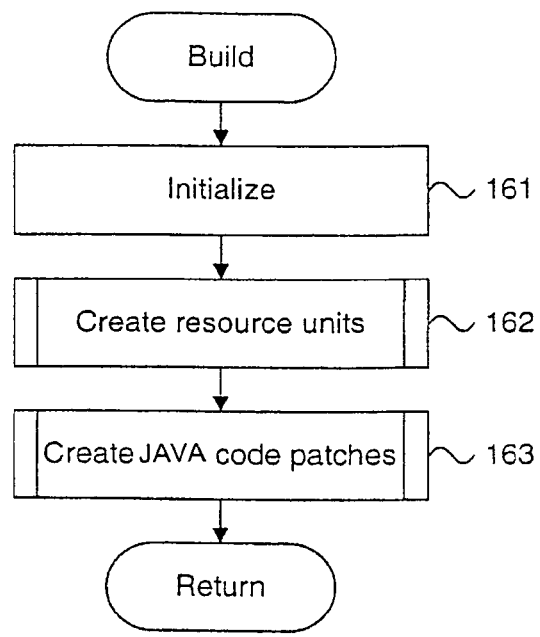
FIG. 11 is a flow diagram showing the routine for building JAVA code patches for use in the method of FIG. 10.

FIG. 11 is a flow diagram showing the routine 160 for building JAVA 15 code patches 20 for use in the method 150 of FIG. 10. The purpose of this routine is to create resource units which are packaged in JAVA code patches 20.

In the initialize phase (block 161), JAVA code patches 20 (shown in FIG. 2) are identified for processing by checking the set of JAVA code patch definitions 37. As necessary, resource units 38 are created (block 162), as further described below with reference to FIG. 12. Finally, the JAVA code patches 20 are created (block 163), as further described below with reference to FIG. 13. The routine then returns.

Figure 12:
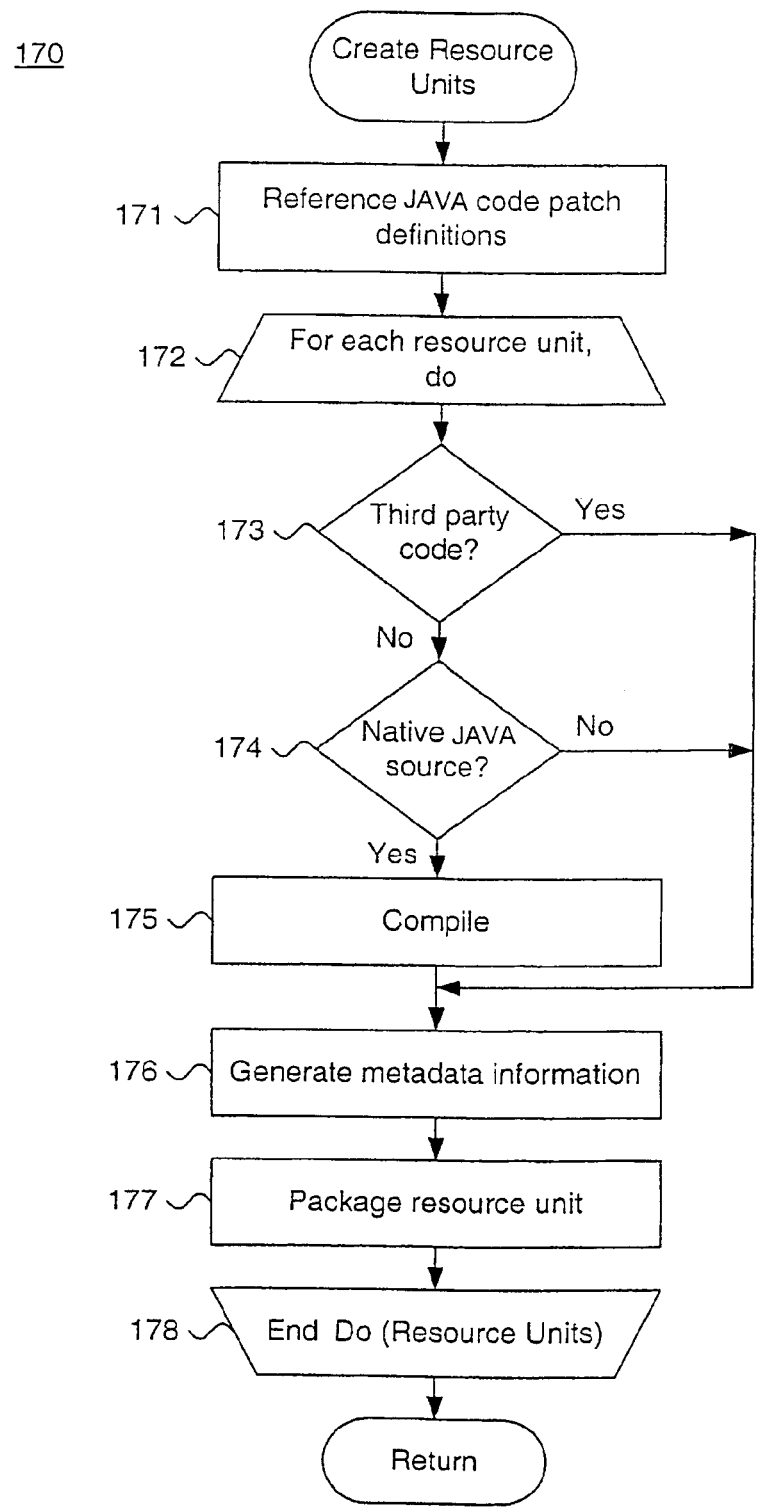
FIG. 12 is a flow diagram showing the routine for creating resource units for use in the routine of FIG. 11.

FIG. 12 is a flow diagram showing a method 170 for creating resource units 38 (shown in FIG. 2) for use in the routine 160 of FIG. 11. The 25 purpose of this routine is to generate a set of resource units 38 from a set of source files 19 (shown in FIG. 1).

The set of resource units 38 to be generated is identified by referring to the JAVA code patch definitions 37 (block 171). Each identified resource unit 38 is processed in an iterative loop (blocks 172–178). During each iterative loop (block 172), the resource unit 38 definition is first checked for third-party code (block 173) and native JAVA source code (block 174). If the resource unit does not contain third-party code (block 173) but does contain native JAVA source code (block 174), the JAVA source code is compiled (block 175) using a JAVA compiler 121 (shown in FIG. 7). Metadata information 124 is generated by the metadata generator 122 (block 176). Finally, the resource unit 38 is packaged (block 177) using resource unit packager 123 (shown in FIG. 7). Processing continues with the next resource unit (block 178), until all resource units have been processed (blocks 172–178). The routine then returns.

Figure 13:
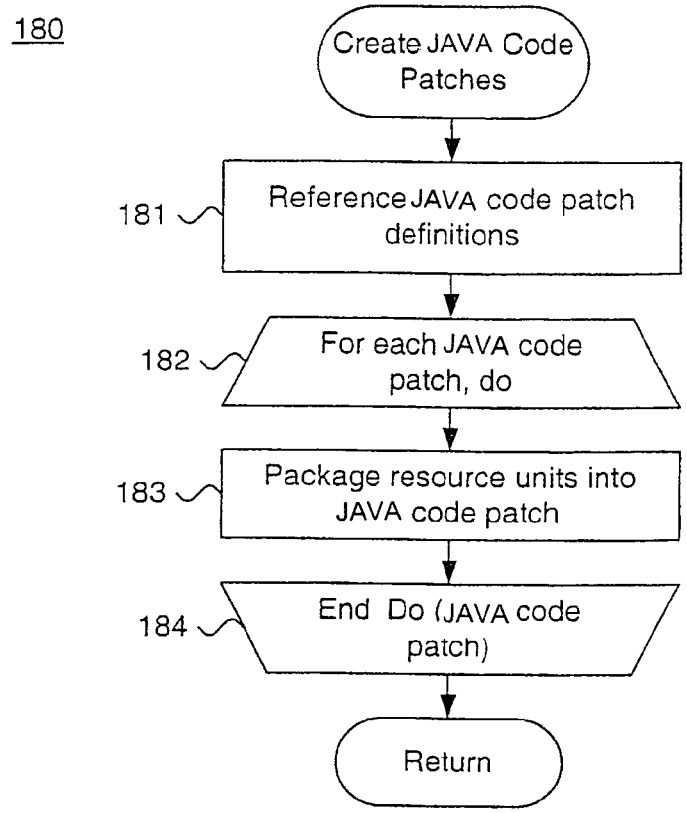
FIG. 13 is a flow diagram showing the routine for creating JAVA code patches for use in the routine of FIG. 11.

FIG. 13 is a flow diagram showing a routine 180 for creating JAVA code patches 20 (shown in FIG. 2) for use in the routine 160 of FIG. 11. 10 The purpose of this routine is to create JAVA code patches 20 as defined by the set of JAVA code patch definitions 37.

The set of JAVA code patch definitions 37 is referenced (block 181). Each resource unit 38 referenced in the JAVA code patch definitions 37 is processed in an iterative loop (blocks 182–184). During each iterative loop (block 182), resource units 38 are packaged into a JAVA code patch 20 (block 183) using the packager 32 of the patch generator 17 (shown in FIG. 2). The iterative processing continues with each JAVA code patch 20 (block 184) until all of the JAVA code patches have been packaged (blocks 182–184). The routine then returns.

Figure 14:
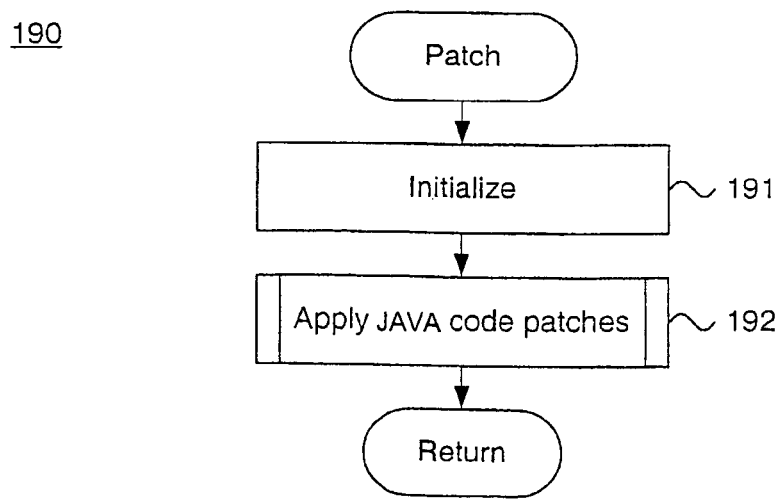
FIG. 14 is a flow diagram showing the routine for patching staged code for use in the method of FIG. 10.

FIG. 14 is a flow diagram showing a routine 190 for patching staged code for use in the method 150 of FIG. 10. The purpose of this routine is to apply JAVA code patches 20 (shown in FIG. 3) to staged code 24 (shown in FIG. 3).

Initially, the JAVA code patches 20 are identified for processing (block 25 191). The JAVA code patches 20 are then applied (block 192), as further described below with reference to FIG. 15. The routine then returns.

Figure 15:
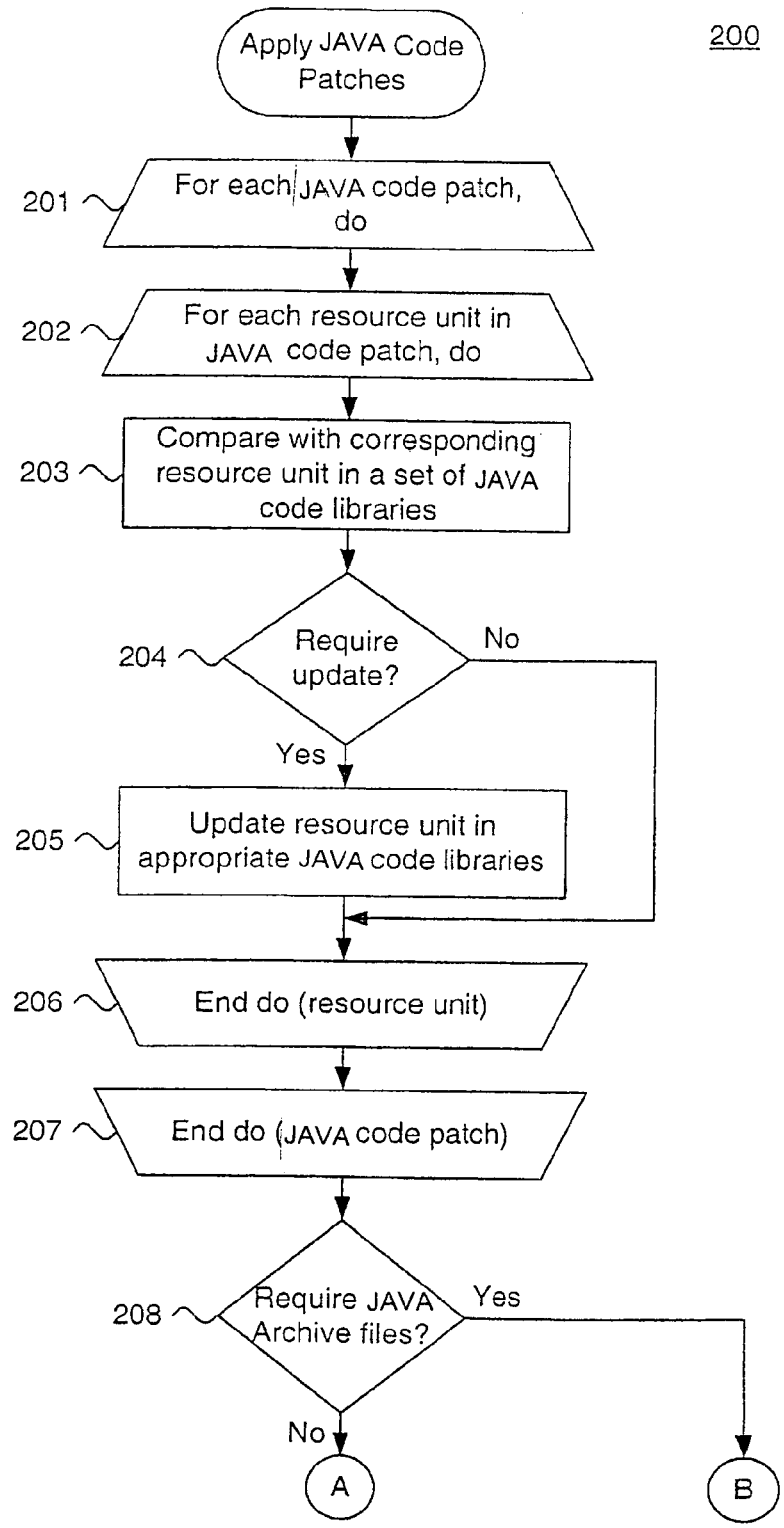
FIG. 15 is a flow diagram showing the routine for applying JAVA code patches for use in the routine of FIG. 14.

FIG. 15 is a flow diagram showing a routine 200 for applying JAVA code patches 20 (shown in FIG. 3) for use in the routine 190 of FIG. 14. The purpose of this routine is to merge the resource units 38 included in a set of JAVA code patches 20 into a set of staged JAVA code libraries 41 and, as required, JAVA archive files 42 (shown in FIG. 3).

The routine merges a set of JAVA code patches 20 using a set of nested iterative processing loops (blocks 201–207 and 202–206). During each outer iterative loop (blocks 201–207), a JAVA code patch 20 is processed. During each inner iterative loop (blocks 202–206), a resource unit 38 included in the JAVA code patch 20 is processed. Resource units 38 in a JAVA code patch 20 are compared to corresponding resource units in JAVA code libraries 41 (block 203). If a JAVA code library 41 requires updating (block 204), the resource unit 38 in the JAVA code library 41 is updated (block 205). Processing continues with each subsequent resource unit 38 in the JAVA code patch 20 (block 206) and for each remaining JAVA code patch 20 (block 207). The routine then returns if JAVA archive files 42 are not required (block 208).

Otherwise, if JAVA archive files are required (block 208), the set of JAVA archive file definitions 43 (shown in FIG. 3) are iteratively processed (blocks 209–216). During each iterative loop (block 209), the metadata information in JAVA archive files 42 and JAVA code libraries 41 is read (blocks 210 and 211, respectively). If the JAVA archive file 42 requires updating (block 212), the JAVA archive file 42 is updated (or created, if necessary) by extracting resource units 38 from the appropriate JAVA code libraries 41 (block 213). Updating is necessary when any resource unit 38 in the JAVA archive file 42 is out-of-date. Also, if a JAVA archive file 42 is obsolete (block 212), the JAVA archive file 42 is deleted (block 213). If the JAVA archive file 42 requires authentication by digital signature (block 214), the JAVA archive file 42 is digitally signed using a digital certificate 145 (shown in FIG. 9) (block 215). Processing continues with each JAVA archive file definition 42 (block 216) until all JAVA archive file definitions 42 have been processed (blocks 209–216), after which the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing a JAVA code release infrastructure with granular code patching, comprising:
   a computer readable storage medium holding one or more JAVA code patches, each comprising at least one resource unit, each resource unit comprising metadata and file components;
   a computer readable storage medium holding one or more to-be-patched JAVA code libraries, each comprising at least one such resource unit;
   a computer readable storage medium holding a patch tool, comprising:
   a compare module that determines which units in the to-be-patched JAVA code libraries are outdated by comparing the metadata for each such resource unit in the JAVA code patches to the metadata for each such corresponding resource unit in the to-be-patched JAVA code libraries; and
   a merge module merging each such resource unit in the JAVA code patches into the to-be-patched JAVA code libraries for each such corresponding resource unit that is out-of-date.

2. A system according to claim 1, further comprising:
   an extract module extracting at least one resource unit from the JAVA code libraries and modifying one or more JAVA archive files that are out-of-date with the at least one extracted resource unit.

3. A system according to claim 1, further comprising:
   a sign module signing the JAVA archive files using a digital certificate.

4. A system according to claim 1, wherein the one or more JAVA archive files are modified through at least one of creation, revision or deletion.

5. A system according to claim 1, further comprising:
   a source repository storing the source file components;
   a staged patch repository storing the one or more JAVA code patches; and
   a staged code repository organizing the one or more JAVA code libraries and the JAVA archive files.

6. A system according to claim 1, further comprising:
   a resource unit generator processing the file components into at least one such resource unit; and
   a packager packaging at least one such resource unit into one or more of the JAVA code patches.

7. A system according to claim 6, further comprising:
   stored JAVA source code provided as the file components.

8. A system according to claim 7, further comprising:
a compiler compiling at least one JAVA source code file into one or more JAVA classes; and
a resource unit packager module storing the JAVA classes into at least one such resource unit as the file components.

9. A system according to claim 6, further comprising:
at least one of non-JAVA source and derived code provided as the file components.

10. A system according to claim 6, further comprising:
third party code provided as the file components.

11. A system according to claim 6, further comprising:
a metadata generator generating the metadata for each such resource unit; and
a resource unit packager module storing the generated metadata into the resource unit.

12. A system according to claim 11, wherein the metadata comprises at least one of a unique identifier and a version attribute.

13. A system according to claim 1, further comprising:
a compare module using a set of rules allowing one of an older resource unit to be replaced by a newer resource unit and a newer resource unit to be replaced by an older resource unit to back out a previously-applied JAVA code patch.

14. A system according to claim 1, further comprising:
one or more JAVA archive files, each comprising at least one resource unit corresponding to one such resource unit in the JAVA code libraries; and
a patch tool referencing JAVA archive file definitions which each correspond to one or more of the JAVA archive files.

15. A system according to claim 14, further comprising:
an extract module extracting the resource units from the JAVA code libraries into the JAVA archive files for each such corresponding resource unit that is out-of-date.

16. A system according to claim 15, further comprising:
an extract module referencing third party JAVA code libraries not maintained as part of the infrastructure.

17. A system according to claim 1, further comprising:
JAVA code libraries implemented as a portable virtual file system which can be used directly by a JAVA Virtual Machine.

18. A system according to claim 1, further comprising:
a machine portable infrastructure providing support for JAVA language features by encapsulating JAVA inner classes, nested directory structures, native class names, and native character set.

19. The system of claim 1, wherein the compare module resides on a client machine that is separate from a server machine on which resides a patch generator that generated the one or more JAVA code patches.

20. The system of claim 19, wherein the client machine downloads the one or more JAVA code patches from the server machine.

21. A method for providing a JAVA code release infrastructure with granular code patching, comprising:
providing one or more JAVA code patches, each comprising at least one resource unit, each resource unit comprising metadata and file components;
patching one or more to-be-patched JAVA code libraries, each comprising at least one such resource unit;
comparing the metadata for each such resource unit in the JAVA code patches to the metadata for each such corresponding resource unit in the to-be-patched JAVA code libraries; and
merging each such resource unit in the JAVA code patches into the to-be-patched JAVA code libraries for each such corresponding resource unit that is out-of-date.

22. A method according to claim 21, further comprising:
extracting at least one resource unit from the JAVA code libraries and modifying one or more JAVA archive files that are out-of-date with the at least one extracted resource unit.

23. A method according to claim 21, further comprising:
signing the JAVA archive files using a digital certificate.

24. A method according to claim 21, wherein the one or more JAVA archive files are modified through at least one of creating, updating or deleting.

25. A method according to claim 21, further comprising:
storing source file components into a source repository;
storing one or more JAVA code patches into a staged patch repository; and
organizing one or more JAVA code libraries and the JAVA archive files into a staged code repository.

26. A method according to claim 21, further comprising:
processing the file components into at least one such resource unit; and
packaging at least one such resource unit into one or more of the JAVA code patches.

27. A method according to claim 26, further comprising:
providing JAVA source code as the file components.

28. A method according to claim 25, further comprising:
compiling at least one JAVA source code file into one or more JAVA classes; and
storing the JAVA classes into at least one such resource unit as the file components.

29. A method according to claim 26, further comprising:
providing at least one of non-JAVA source and derived code as the file components.

30. A method according to claim 26, further comprising:
providing third party code as the file components.

31. A method according to claim 26, further comprising:
generating the metadata for each such resource unit; and
storing the generated metadata into the resource unit.

32. A method according to claim 31, wherein the metadata comprises at least one of a unique identifier and a version attribute.

33. A method according to claim 21, further comprising:
using a set of rules to allow one of an older resource unit to be replaced by a newer resource unit and a newer resource unit to be replaced by an older 3 resource unit to back out a previously-applied JAVA code patch.

34. A method according to claim 21, further comprising:
providing one or more JAVA archive files, each comprising at least one resource unit corresponding to one such resource unit in the JAVA code libraries; and
referencing JAVA archive file definitions which each correspond to one or more of the JAVA archive files.

35. A method according to claim 34, further comprising:
extracting the resource units from the JAVA code libraries for each such corresponding resource unit that is out-of-date.

36. A method according to claim 35, further comprising:
referencing third party JAVA code libraries not maintained as part of the infrastructure.

37. A method according to claim 21, further comprising:
implementing JAVA code libraries as a portable virtual file system which can be used directly by a JAVA Virtual Machine.

38. A method according to claim 21, further comprising:
providing a machine portable infrastructure supporting JAVA language features by encapsulating JAVA inner classes, nested directory structures, native class names, and native character set.

39. A computer-readable storage medium holding code for performing the method of claim 21.

40. The method of claim 21, wherein the step of comparing is performed on a client machine that is separate from a server machine on which resides a patch generator that generated the one or more JAVA code patches.

41. The method of claim 40, further comprising downloading the one or more JAVA code patches from the server machine to the client machine.

42. A system for patching staged code in a staged JAVA code release infrastructure, comprising:
a staged code repository maintaining one or more staged to-be-patched JAVA code libraries, each staged to-be-patched JAVA code library comprising at least one resource unit, each resource unit comprising metadata and file components;
a staged patch repository storing one or more JAVA code patches, each JAVA code patch comprising at least one resource unit corresponding to one such resource unit specified in a JAVA code patch definition; and
a patch tool accessing one or more JAVA code patches in the staged patch repository, comprising:
a compare module comparing the metadata for each resource unit in the JAVA code patches to the metadata in the staged to-be-patched JAVA code libraries for each such corresponding resource unit; and
a merge module merging each resource unit in the JAVA code patches into the staged to-be-patched JAVA code libraries for each such corresponding resource unit that is out-of-date.

43. A system according to claim 42, further comprising:
an extract module referencing JAVA archive file definitions which each correspond to a staged JAVA archive file, each staged JAVA archive file comprising at least one resource unit corresponding to one such resource unit in the staged JAVA code libraries.

44. A system according to claim 43, further comprising:
an extract module extracting one such resource unit from the staged JAVA code libraries into the staged JAVA archive files for each such corresponding resource unit that is out-of-date.

45. A system according to claim 44, further comprising:
a sign module creating a digital signature for the staged JAVA archive files using a digital certificate.

46. The system of claim 42, wherein the compare module resides on a client machine that is separate from a server machine on which resides a patch generator that generated the JAVA code patches.

47. A method for patching staged code in a JAVA code release infrastructure, comprising:
maintaining one or more staged to-be-patched JAVA code libraries in a staged code repository, each staged to-be-patched JAVA code library comprising at least one resource unit, each resource unit comprising metadata and file components;
accessing one or more JAVA code patches in a staged patch repository, each JAVA code patch comprising at least one resource unit corresponding to one such resource unit specified in a JAVA code patch definition;
comparing the metadata for each resource unit in the JAVA code patches to the metadata in the staged to-be-patched JAVA code libraries for each such corresponding resource unit; and
merging each resource unit in the JAVA code patches into the staged to-be-patched JAVA code libraries for each such corresponding resource unit that is out-of-date.

48. A method according to claim 47, further comprising:
referencing JAVA archive file definitions which each correspond to a staged JAVA archive file, each staged JAVA archive file comprising at least one resource unit corresponding to one such resource unit in the staged JAVA code libraries.

49. A method according to claim 48, further comprising:
extracting one such resource unit from the staged JAVA code libraries into the staged JAVA archive files for each such corresponding resource unit that is out-of-date.

50. A method according to claim 49, further comprising:
creating a digital signature for the staged JAVA archive files using a digital certificate.

51. A computer-readable storage medium holding code for performing the method of claim 47.

52. The method of claim 47, wherein the step of comparing is performed on a client machine that is separate from a server machine on which resides a patch generator that generated the JAVA code patches.

53. A computer-implemented method for patching code, the method comprising:
downloading, to a client machine, from a server machine that is separate from the client machine, one or more patches that were generated on the server machine;
comparing, at the client machine, (a) contents of the one or more patches to (b) code that is not resident on the server machine;
based on the comparing, determining one or more out-of-date portions within the code; and
applying at least a part of the one or more patches to the out-of-date portions without applying any part of the one or more patches to parts of the code other than the out-of-date portions.

* * * * *